Patented Feb. 7, 1950

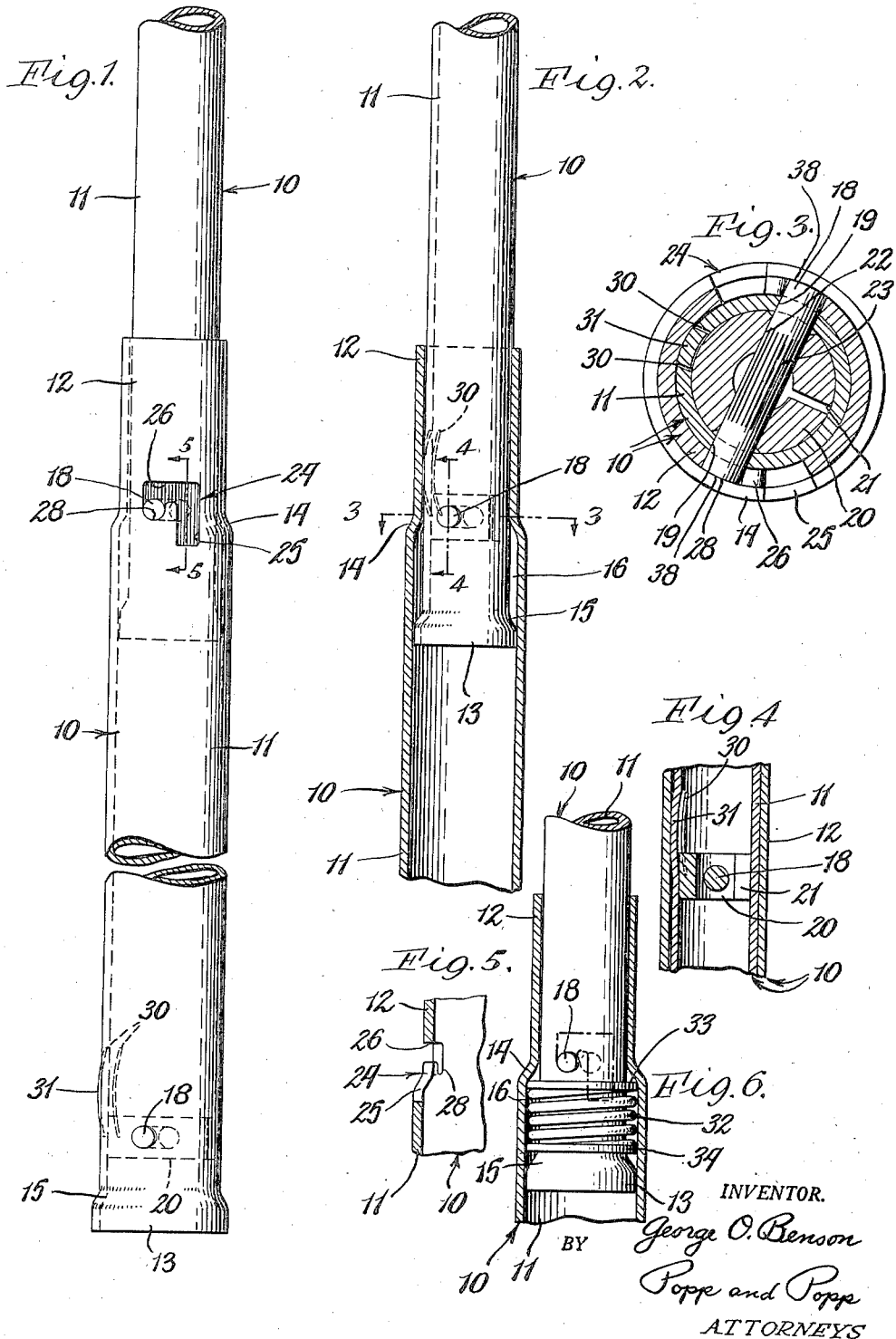

2,496,264

UNITED STATES PATENT OFFICE 2,496,264

TELESCOPING STRUCTURE

George O. Benson, Niagara Falls, N. Y., assignor to Chisholm-Ryder Company, Incorporated, Niagara Falls, N. Y., a corporation of New York Application July 26, 1945, Serial No. 607,214

11 Claims. (Cl. 287—58)

This invention relates to a telescopic structure and more particularly to such a structure, such as a portable radio antenna, composed of telescoping sections which are nested together and which can be rapidly extended to provide a mast capable of being set up on any mobile or stationary support and used for sending or receiving radio messages. However, the invention is not confined to any particular use and can also be used as a telescopic support for signal lights and for other like uses, such as tent poles.

One of the principal objects of the present invention is to provide such a telescopic structure in which the sections can be quickly extended and quickly collapsed and in which the structure is securely held in its extended position with little danger of accidental release.

Another object is to provide such a telescopic structure which, when extended, is strong and will adequately resist axial, torsional and bending strains.

Another object is to provide such a telescoping joint including a cross pin in which the cross pin can be located so as to impair the strength of the telescopic joint to the least degree.

Another object is to provide a telescopic structure which does not require tools to extend or collapse the several sections.

Another aim is to provide such a telescopic structure which is simple and inexpensive in construction and can be repeatedly extended and nested without objectionable wear or deterioration.

Another aim is to provide a telescopic structure in which the means for holding the sections in an extended position is formed principally from the metal of the walls of the telescoping sections thereby to reduce the number of parts and to simplify the fabrication and assembly of the structure.

Another aim is to provide such a telescopic structure composed of metal tubes in which good electrical contact is insured between the several tubes so that it can be employed as a radio antenna.

Another object is to provide such a telescopic structure in which the sections can be yieldingly held in their extended position by a simple and reliable spring mechanism provided in each telescopic joint.

Other objects and advantages will appear from the following description and drawings in which:

Fig. 1 is a fragmentary side elevation of two sections of a telescope mast embodying the present invention.

Fig. 2 is a view similar to Fig. 1 showing the larger telescoping section in section.

Fig. 3 is an enlarged cross section taken on line 3—3, Fig. 2.

Fig. 4 is a fragmentary vertical section taken along line 4—4, Fig. 2 in a radial plane.

Fig. 5 is a fragmentary vertical section taken on line 5—5, Fig. 1.

Fig. 6 is a view similar to Fig. 2 showing a modified form of the invention.

While the invention is not confined to any particular use, it is shown as embodied in a metal antenna mast comprising a series of telescoping tubular metal sections 10, 10 which can be provided in any number and are of progressively smaller diameter so as to telescope into one another. Since the sections 10, 10 except as to size, are identical in construction, the same reference numerals are applied to the similar parts of the several sections. It will be understood that the base and tip sections (not shown) of the mast may be suitably modified to close the ends of the same and to eliminate such parts as would serve no function in these base and tip sections.

Each of the telescoping tubular sections which constitutes the main body of the mast is in the form of a tubular metal shell having a substantially uniform wall thickness throughout and comprising a central cylindrical body portion 11, a cylindrical end or end sleeve 12 of reduced diameter and a cylindrical opposite end 13 of enlarged diameter which can be integral with the body portion, as shown, or in the form of a separately attached collar or sleeve. The reduced cylindrical end 12 of each section is of substantial length and is of such inside diameter as to fit snugly the central body portion 11 of the next smaller section 10 while the enlarged cylindrical portion 13 is of such outside diameter as to fit snugly the bore of the central body portion 11 of the next larger section 10. The reduced cylindrical end 12 of each section is connected to the central body portion 11 thereof by a rounded shoulder 14 formed by laterally offsetting the wall of the section. The enlarged cylindrical end 13 of each section is likewise connected to the central body portion 11 thereof by a rounded shoulder 15 formed by laterally offsetting the wall of the section, the shoulder 15 and enlarged cylindrical end 13 jointly forming an enlarged bell-shaped or flared end. It will be seen that by this shape of the parts an annular chamber 16 is provided between the central body portion 11 of each section and the body portions 11 of the succeeding larger and smaller sections. It will further be seen that the flared ends or collars 13 insure alinement of the several sections in the extended condition of the mast and also serve to distribute the transverse strains at each joint.

The central body portion 11 of each section 10 is provided near that end adjacent its bell-shaped enlargement 13, 15 with a cross pin 18 which extends diametrically therethrough and has opposite projecting ends which extend into the chamber 16 surrounding the section. As best shown in Fig. 3 each of these pins extends through holes 19 provided in diametrically opposite sides of the central body portion 11 of the corresponding section 10. Each of these pins is secured in any suitable manner, the means shown comprising a cylindrical metal plug 20 slotted or split axially along one side, as indicated at 21, so as to be C-shaped in cross section and provided with diametrically opposite openings 22 in its legs which receive the pin 18. By the use of a plug a greatly increased bearing area is provided for the pin 18 as compared with just the wall of the tubing itself. To hold the pin against endwise displacement and loosening it is preferably knurled, as indicated at 23. By slotting the plug 20 it can be made to conform to the slight variations in the inside diameters of the bodies 11 of the tubes, these variations being the normal production tolerances allowed in the manufacture of such tubing. Thus if the tubing is slightly oversize the plug 20 can be expanded to fit the tubing tightly and, conversely, if the tubing is slightly undersize in diameter the plug can be compressed to obtain the desired fit.

In the extended position of the sections 10 the opposite projecting ends of each pin are received in a pair of bayonet slots 24 provided in diametrically opposite sides of the shoulder 14 and reduced cylindrical end 12 of the next succeeding larger section 10. As best shown in Figs. 1 and 5 the axially extending entrance portion 25 of each of these bayonet slots starts in the body portion 11 of each tube and extends through the shoulder 14 into the reduced end 12 thereof. The circumferentially extending portion 26 and reversely recessed portion 28 of each of these bayonet slots is in the reduced cylindrical end 12 of its section 10. Accordingly it will be seen that any pair of sections 10 can be extended relatively to each other until the projecting ends of the pin 18 of the smaller section strike the annular shoulder 14 leading to the reduced cylindrical end 12 of the larger section. The two sections 10 are then turned relative to each other until the projecting ends of the pin 18 of the smaller section find the entrance portions 25 of the diametrically opposite pair of bayonet slots 24 of the larger section. The sections 10 can then be drawn axially further apart, the projecting ends of the pin 18 of the smaller section traveling along the axially extending entrance portions 25 of the bayonet slots 24 in the larger section until the ends of this pin are in the circumferentially extending portions 26 thereof. The sections 10 can then be turned relative to each other to cause the ends of this pin 18 to travel along the circumferentially extending portions 26 of these slots 24 until the ends of this pin are disposed above the reversely recessed portions 28 of these slots when this pin, together with the smaller section 10, will drop into these reversely recessed portions of the bayonet slots. In this position the two sections are reliably retained in extended position by the pin and bayonet slot connection therebetween and hence a telescopic mast composed of such sections will be retained in an erect position. The sections of the mast are nested by a reverse manipulation of each pair of the telescopic sections 10.

The opposite ends of each pin 18 are preferably curved to conform to the exterior face of the reduced portion 12 in which it is fitted, as indicated at 38, to insure maximum bearing contact for supporting the pin in the bayonet slot when the mast is extended, as best shown in Fig. 3.

In order to obtain good electrical contact between each section 10 and the next succeeding larger section 10, the central body portion 11 of each section 10 is provided with a pair of spaced axially extending slits 30 near the bell-shaped enlargement 13, 15 thereof and in position to register with the reduced cylindrical end 12 of the next succeeding larger section when the sections are extended. The metal 31 between these slits 30 is bent outwardly and hence when the sections are extended this outwardly bent strip of metal 31 is brought into firm electrical contact with the bore of the reduced cylindrical end of the next succeeding larger section, as best illustrated in Fig. 4. It will be seen that the successive electrical contacts provided by these outwardly bent strips of metal 31 unite the mast into a unitary electrical conductor.

In order to further insure the retention of the mast in its extended condition, a spring bias can be interposed between each pair of sections 10 and which yieldingly urges the ends of the pins 18 into the reversely extending portions 28 of the bayonet slots 24. Such a construction is illustrated in Fig. 6 in which a short helical compression spring 32 is interposed between the shoulder 15 of the enlarged end 13 and the shoulder 14 of the reduced cylindrical end 12 of the next succeeding larger section. This spring is compressed in manipulating the corresponding pin 18 into its bayonet slots 24 and to prevent binding of either end of this spring between the sections, washers 33 and 34 can be provided at opposite ends thereof, these washers loosely fitting the periphery of the central body portion 11 of the smaller section and loosely fitting the bore in the central body portion 11 of the larger section. It will be seen that since the spring 32 must be compressed in seating the ends of the pin 18 in the bayonet slots 24, the pressure of this spring tends to retain the ends of this pin in the reversely recessed portion 28 of these slots and hence holds the mast erect and against danger of accidental collapse, the nesting of the mast, by the particular manipulation required, being initially resisted by the several springs 32.

An important feature of the invention resides in the location of the pin 18 and also the bayonet slots 24 near the center of each lap of the telescopic joint when the mast is extended. The pin 18 requires the holes 22 to be drilled in the smaller tubular section for its reception, thereby weakening the smaller tube at this point. The bayonet slots 24 also weaken the outer or larger tube. It is accordingly desirable to locate these weakened portions of both the inner tube and the outer tube remote from the zones of greatest strain upon the joint. With a bending strain on the mast the extremity of the reduced portion 12 and the extremity of the enlarged portion 13 of each joint act as fulcrums and hence define the zones of greatest strain upon the mast under bending forces. By locating the pins 18 and bayonet slots 24 between these fulcrum zones, the weakened portions of both the inner and outer tubes are removed from these zones of greatest strain. The length or extent of lap in each joint, as well as the relation between the weakened zones to the zones of greatest strain can also be controlled by the predetermined location of the pin 18 relative to the extremity of the enlarged end 13 of the section in which it is mounted. Thus, by locating the pin 18 further from this extremity the lap is increased and bringing the pin 18 closer to this extremity decreases the lap. The desirable length of the overlap is determined by the diameter of the tubing at the joint. Roughly the overlap should be three to four times this tube diameter.

It will also be been that an important feature of the invention resides in the provision of the entrance portion of each bayonet slot in the shoulder 14 with the other portions of each bayonet slot in the reduced cylindrical end 12. By this means the bayonet slots are formed directly in the bodies of the tubes and are in position to receive the ends of the cross pins from between the chambers provided by the tubes, to releasably support the ends of the pins, and to release the ends of the cross pins back to these chambers. Further, this arrangement permits of the simple spring loading of the telescopic sections as shown in Fig. 6.

From the foregoing it will be seen that the present invention provides an extremely simple and rugged telescopic structure which is composed of few parts and at the same time is reliably held in an extended condition until intentionally nested.

I claim as my invention:

1. A telescopic structure, comprising inner and outer slidably and rotatably interfitted tubes having body portions providing between them a longitudinally extending chamber which surrounds one end of said inner tube, a tubular end sleeve for the body portion of said outer tube and of reduced internal diameter to fit the body portion of said inner tube, means connecting said tubular end sleeve with said body portion of said outer tube and providing an internal annular shoulder in said outer tube at the corresponding end of said chamber, and a member projecting laterally outwardly from said one end of said inner tube into said chamber, said shoulder and tubular end sleeve being recessed to receive said projecting member and releasably support said inner tube in an extended position.

2. A telescopic structure, comprising inner and outer slidably and rotatably interfitted tubes having body portions providing between them a longitudinally extending chamber which surrounds one end of said inner tube, a tubular end sleeve for the body portion of said outer tube and of reduced internal diameter to fit the body portion of said inner tube, means connecting said tubular end sleeve with said body portion of said outer tube and providing an internal annular shoulder in said outer tube at the corresponding end of said chamber, and a member projecting laterally outwardly from said one end of said inner tube into said chamber, said shoulder and tubular end sleeve being provided with a bayonet slot adapted to receive said projecting member and releasably support said inner tube in an extended position, said bayonet slot having its entrance portion in said shoulder, its transverse portion extending circumferentially of said tubular end sleeve, and its reversely notched portion in said tubular end sleeve.

3. A telescopic structure, comprising inner and outer slidably and rotatably interfitted tubes having body portions providing between them a longitudinally extending chamber which surrounds one end of said inner tube, a tubular end sleeve for the body portion of said outer tube and of reduced internal diameter to fit the body portion of said inner tube, means connecting said tubular end sleeve with said body portion of said outer tube and providing an internal annular shoulder in said outer tube at the corresponding end of said chamber, a circular enlargement provided on said one end of said inner tube and fitting the bore of the body portion of said outer tube, and a member projecting laterally outwardly from said inner tube adjacent said enlargement into said chamber, said shoulder and tubular end sleeve being recessed to receive said projecting member and releasably support said inner tube in an extended position.

4. A telescopic structure, comprising inner and outer slidably and rotatably interfitted tubes having body portions providing between them a longitudinally extending chamber which surrounds one end of said inner tube, a tubular end sleeve for the body portion of said outer tube and of reduced internal diameter to fit the body portion of said inner tube, means connecting said tubular end sleeve with said body portion of said outer tube and providing an internal annular shoulder in said outer tube at the corresponding end of said chamber, a circular enlargement provided on said one end of said inner tube and fitting the bore of the body portion of said outer tube and providing an annular shoulder on said inner tube opposing said annular shoulder of said outer tube, a member projecting laterally outwardly from said inner tube adjacent said enlargement into said chamber, said shoulder of said outer tube and said tubular end sleeve being provided with a bayonet slot adapted to receive said projecting member and releasably support said inner tube in an extended position, said bayonet slot having its entrance portion in said shoulder of said outer tube, its transverse portion extending circumferentially of said tubular end sleeve, and its reversely notched portion in said tubular end sleeve, and a helical compression spring within said chamber around the body portion of said inner tube and bearing at its opposite ends against said shoulders in the extended position of said tubes to yieldingly hold said projecting member in said reversely notched portion.

5. A telescopic structure, comprising inner and outer slidably and rotatably interfitted tubes having body portions providing between them a longitudinally extending chamber which surrounds one end of said inner tube, one end of said outer tube being reduced to fit the body portion of said inner tube and to provide an annular inwardly extending shoulder forming one end of said chamber, and a member projecting laterally outwardly from said one end of said inner tube into said chamber, said shoulder and reduced end being recessed to receive said projecting member and releasably support said inner tube in an extended position.

6. A telescopic structure, comprising inner and outer slidably and rotatably interfitted tubes having body portions providing between them a longitudinally extending chamber which surrounds one end of said inner tube, one end of said outer tube being reduced to fit the body portion of said inner tube and to provide an annular inwardly extending shoulder forming one end of said chamber, and a member projecting laterally outwardly from said one end of said inner tube into said chamber, said shoulder and reduced end being provided with a bayonet slot adapted to receive said projecting member and releasably support said inner tube in an extended position, said bayonet slot having its entrance portion in said shoulder, its transverse portion extending circumferentially of said reduced end and its reversely notched portion in said reduced end.

7. A telescopic structure, comprising inner and outer slidably and rotatably interfitted tubes having body portions providing between them a longitudinally extending chamber which surrounds one end of said inner tube, one end of said outer tube being reduced to fit the body portion of said inner tube and to provide an annular inwardly extending shoulder forming one end of said chamber, an enlarged flare provided on said one end of said inner tube and fitting the bore of the body portion of said outer tube, and a member projecting laterally outwardly from said inner tube adjacent to but spaced from said flare, said shoulder and reduced end being recessed to receive said projecting member and releasably support said inner tube in an extended position.

8. A telescopic structure, comprising inner and outer slidably and rotatably interfitted tubes having body portions providing between them a longitudinally extending chamber which surrounds one end of said inner tube, a tubular end sleeve for the body portion of said outer tube and of reduced internal diameter to fit the body portion of said inner tube, means connecting said tubular end sleeve with said body portion of said outer tube and providing an internal annular shoulder in said outer tube at the corresponding end of said chamber, and a pin extending through said one end of said inner tube with its opposite ends projecting into said chamber, said shoulder and tubular end sleeve being recessed on opposite sides of said outer tube to receive said projecting ends of said pin and releasably support said inner tube in an extended position.

9. A telescopic structure, comprising inner and outer slidably and rotatably interfitted tubes having body portions providing between them a longitudinally extending chamber which surrounds one end of said inner tube, a tubular end sleeve for the body portion of said outer tube and of reduced internal diameter to fit the body portion of said inner tube, means connecting said tubular end sleeve with said body portion of said outer tube and providing an internal annular shoulder in said outer tube at the corresponding end of said chamber, and a pin extending through said one end of said inner tube with its opposite ends projecting into said chamber, said shoulder and tubular end sleeve being provided with a pair of bayonet slots on their opposite sides adapted to receive said projecting ends of said pin, each of said bayonet slots having its entrance portion in said shoulder, its transverse portion in said tubular end sleeve, and its reversely notched portion in said tubular end sleeve.

10. A telescopic structure, comprising inner and outer slidably and rotatably interfitted tubes having body portions providing between them a longitudinally extending chamber which surrounds one end of said inner tube, one end of said outer tube being reduced to provide an annular inwardly extending shoulder forming one end of said chamber and an integral reduced cylindrical end fitting the body portion of said inner tube, an enlarged flare provided on said one end of said inner tube and fitting the bore of the body portion of said outer tube, and a pin extending through said inner tube adjacent to but spaced from said flare and having its opposite ends projecting into said chamber, said shoulder and reduced end being provided with a pair of bayonet slots on their opposite sides adapted to receive said projecting ends of said pin, each of said bayonet slots having its entrance portion in said shoulder, its transverse portion in said reduced end, and its reversely notched portion in said reduced end.

11. A telescopic structure comprising inner and outer slidably and rotatably interfitted tubes, said outer tube being slotted on its opposite sides, said inner tube being provided with openings extending through its opposite sides, a pin extending through said openings and having its opposite ends projecting outwardly therefrom into said slots, and means for retaining said pin in said inner tube, comprising a plug which is C-shaped in cross section and having bores extending transversely through its legs and penetrated by said pin, said legs being capable of being distorted to fit the bore of said inner tube.

GEORGE O. BENSON.

REFERENCES CITED

The following references are of record in the file of this patent:

UNITED STATES PATENTS

| Number | Name | Date |
| --- | --- | --- |
| 355,052 | Barker | Dec. 28, 1886 |
| 730,015 | Halladay | June 2, 1903 |
| 1,033,430 | Matheson | July 23, 1912 |
| 1,267,915 | Shellabarger | May 28, 1918 |
| 1,806,059 | Hoople | May 19, 1931 |
| 2,354,806 | Fletcher | Aug. 1, 1944 |
| 2,389,811 | Ozlek | Nov. 27, 1945 |